US012322802B2

(12) United States Patent
Oura et al.

(10) Patent No.: US 12,322,802 B2
(45) Date of Patent: Jun. 3, 2025

(54) NEGATIVE ELECTRODE FOR LITHIUM ION SECONDARY BATTERY, AND LITHIUM ION SECONDARY BATTERY

(71) Applicant: Panasonic Intellectual Property Management Co., Ltd., Osaka (JP)

(72) Inventors: Yuji Oura, Osaka (JP); Kazuhiro Yoshii, Osaka (JP); Yuta Kuroda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 473 days.

(21) Appl. No.: 17/763,021

(22) PCT Filed: Jul. 21, 2020

(86) PCT No.: PCT/JP2020/028213
§ 371 (c)(1),
(2) Date: Mar. 23, 2022

(87) PCT Pub. No.: WO2021/059705
PCT Pub. Date: Apr. 1, 2021

(65) Prior Publication Data
US 2022/0344659 A1 Oct. 27, 2022

(30) Foreign Application Priority Data
Sep. 27, 2019 (JP) ................. 2019-177955

(51) Int. Cl.
H01M 4/583 (2010.01)
H01M 4/02 (2006.01)
(Continued)

(52) U.S. Cl.
CPC ........... *H01M 4/583* (2013.01); *H01M 4/364* (2013.01); *H01M 4/366* (2013.01); *H01M 4/405* (2013.01);
(Continued)

(58) Field of Classification Search
CPC ...... H01M 4/583; H01M 4/364; H01M 4/366; H01M 4/405; H01M 10/0525; H01M 2004/021; H01M 2004/027
See application file for complete search history.

(56) References Cited

U.S. PATENT DOCUMENTS

2016/0351892 A1    12/2016  Sugimori et al.
2018/0190985 A1*   7/2018   Choi ................... H01M 10/052
(Continued)

FOREIGN PATENT DOCUMENTS

JP    8-287952 A      11/1996
JP    2009-64574 A    3/2009
(Continued)

OTHER PUBLICATIONS

International Search Report dated Oct. 20, 2020, issued in counterpart International Application No. PCT/JP2020/028213, with English Translation. (5 pages).
(Continued)

Primary Examiner — Matthew T Martin
Assistant Examiner — Taylor Harrison Krone
(74) Attorney, Agent, or Firm — WHDA, LLP

(57) ABSTRACT

This negative electrode is provided with a negative electrode current collector, and a negative electrode mixture layer formed on the negative electrode current collector, wherein: the negative electrode mixture layer comprises a first layer arranged on the negative electrode current collector, and a second layer arranged on the first layer; the second layer includes graphite particles A having a particle internal
(Continued)

porosity of at most 10%: the first layer includes graphite particles B having a particle internal porosity of more than 10%; and the second layer has a water contact angle of at most 50°.

7 Claims, 2 Drawing Sheets

(51) Int. Cl.
  *H01M 4/36* (2006.01)
  *H01M 4/40* (2006.01)
  *H01M 10/0525* (2010.01)
(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| 2020/0176753 | A1* | 6/2020 | Lee | H01M 4/366 |
| 2021/0159489 | A1 | 5/2021 | Sugaya et al. | |
| 2022/0131131 | A1 | 4/2022 | Natsumeda et al. | |
| 2022/0216475 | A1 | 7/2022 | Tsuda et al. | |

FOREIGN PATENT DOCUMENTS

| JP | 2011-009203 | A | | 1/2011 | |
| JP | 2012-94261 | A | | 5/2012 | |
| JP | 2014-067638 | A | | 4/2014 | |
| JP | 2017-41407 | A | | 2/2017 | |
| JP | 2018-055952 | A | | 4/2018 | |
| JP | 2018-125077 | A | | 8/2018 | |
| JP | 2018-523912 | A | | 8/2018 | |
| KR | 20170039976 | A | * | 4/2017 | .......... H01M 10/052 |
| WO | 2017/111542 | A1 | | 6/2017 | |
| WO | 2019/239652 | A1 | | 12/2019 | |

OTHER PUBLICATIONS

Final Office Action dated Jan. 14, 2025, issued in U.S. Appl. No. 17/763,087. (13 pages).
Non-Final Office Action dated Sep. 26, 2024, issued in U.S. Appl. No. 17/763,087. (17 pages).
International Search Report dated Oct. 20, 2020, issued in related International application No. PCT/JP2020/028214, with English translation. (4 pages).

* cited by examiner

NEGATIVE ELECTRODE FOR LITHIUM ION SECONDARY BATTERY, AND LITHIUM ION SECONDARY BATTERY

CROSS-REFERENCE TO RELATED APPLICATIONS

This application is a national stage of International Application No. PCT/JP2020/028213, filed Jul. 21, 2020, which claims priority to Japanese Patent Application No. 2019-177955 filed Sep. 27, 2019 both of which are hereby incorporated by reference in their entirety.

TECHNICAL FIELD

The present disclosure relates to a negative electrode for a lithium ion secondary battery, and to a lithium ion secondary battery.

BACKGROUND

For secondary batteries, for example, lithium ion secondary batteries are widely in use which comprise a positive electrode, a negative electrode, and an electrolyte solution, and in which lithium ions are caused to move between the positive electrode and the negative electrode to charge or discharge the battery.

For example, Patent Literature 1 proposes a lithium ion secondary battery in which a fluorine-containing group is modified on a surface of the negative electrode so that affinity with the electrolyte solution is improved.

CITATION LIST

Patent Literature

Patent Literature 1: JP 2017-41407 A

SUMMARY

In lithium ion secondary batteries, reduction of a charge/discharge cycle characteristic is problematic.

An advantage of the present disclosure lies in provision of a negative electrode for a lithium ion secondary battery and a lithium ion secondary battery in which the charge/discharge cycle characteristic of the lithium ion secondary battery can be improved.

According to one aspect of the present disclosure, there is provided a negative electrode for a lithium ion secondary battery, the negative electrode including: a negative electrode electricity collector; and a negative electrode mixture layer formed over the negative electrode electricity collector, wherein the negative electrode mixture layer includes a first layer disposed over the negative electrode electricity collector, and a second layer disposed over the first layer, the second layer includes graphite particles A having a particle internal porosity of 10% or lower, the first layer includes graphite particles B having a particle internal porosity of greater than 10%, and a water contact angle of the second layer is 50° or lower.

According to another aspect of the present disclosure, there is provided a lithium ion secondary battery including the above-described negative electrode for lithium ion secondary battery.

According to the present disclosure, the charge/discharge cycle characteristic of the lithium ion secondary battery can be improved.

DESCRIPTION OF EMBODIMENTS

A negative electrode for a lithium ion secondary battery according to an embodiment of the present disclosure comprises a negative electrode electricity collector, and a negative electrode mixture layer formed over the negative electrode electricity collector, wherein the negative electrode mixture layer includes a first layer disposed over the negative electrode electricity collector, and a second layer disposed over the first layer, the second layer includes graphite particles A having a particle internal porosity of 10% or lower, the first layer includes graphite particles B having a particle internal porosity of greater than 10%, and a water contact angle of the second layer is 50° or lower.

By placing the graphite particles A having the particle internal porosity of 10% or lower in the second layer which is at the surface side of the negative electrode, and setting the water contact angle of the second layer to be 50° or lower as in the present disclosure, a pressure drop when the electrolyte solution flows into the negative electrode is reduced. As a result, it becomes easier for the electrolyte solution to infiltrate into the negative electrode, and, as a consequence, the lithium ion resistance is reduced, and the charge/discharge cycle characteristic of the lithium ion secondary battery is improved. The surface side of the negative electrode described above is a surface opposing a separator or a positive electrode. Because the graphite particles B having the particle internal porosity of greater than 10% easily collapse during manufacturing of the negative electrode, an adhesiveness between the negative electrode electricity collector and the graphite particles B is high. Therefore, by placing the graphite particles B having the particle internal porosity of greater than 10% in the first layer disposed over the negative electrode electricity collector, detachment of the particles of a negative electrode active material from the negative electrode electricity collector can be suppressed, and the charge/discharge cycle characteristic of the lithium ion secondary battery can thus be improved.

A negative electrode for a lithium ion secondary battery, and a lithium ion secondary battery according to an embodiment of the present disclosure will now be described in detail with reference to the drawings. In the present disclosure, a description of "numerical value (1)~numerical value (2)" means a value greater than or equal to the numerical value (1) and lower than or equal to the numerical value (2).

Figure 1:
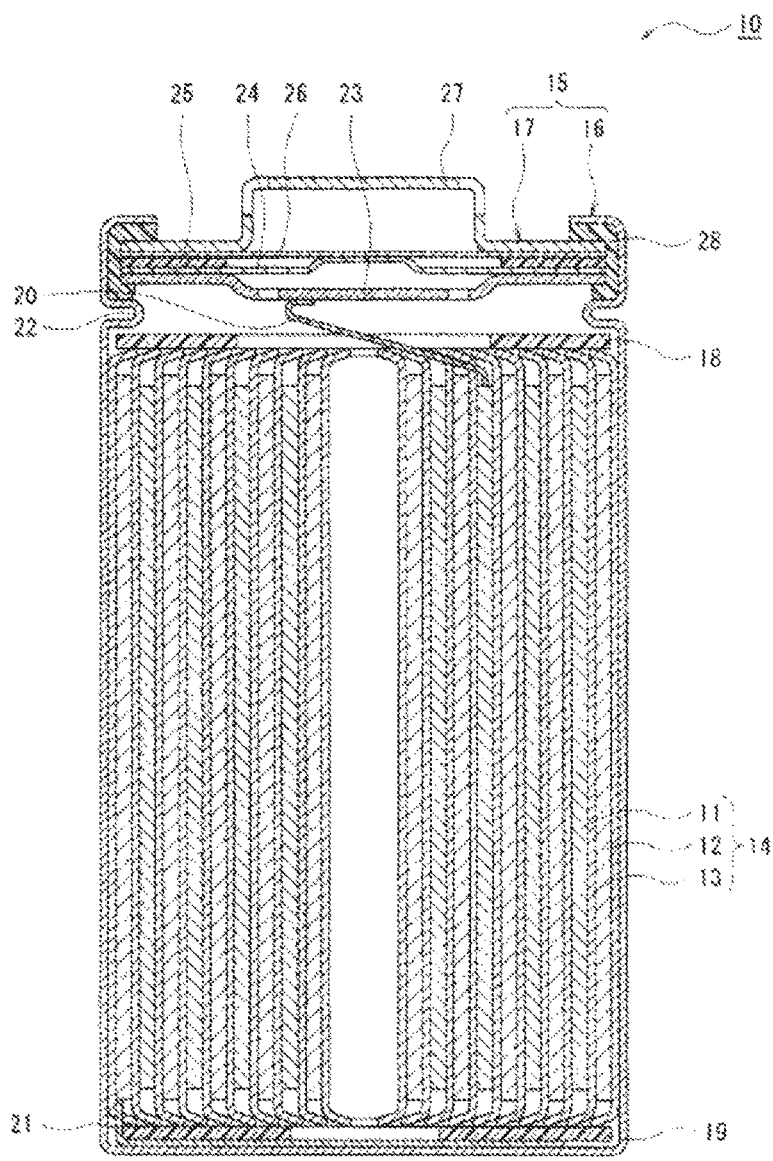
FIG. 1 is a cross-sectional diagram showing a lithium ion secondary battery according to an embodiment of the present disclosure.

FIG. 1 is a cross-sectional diagram of a lithium ion secondary battery according to an embodiment of the present disclosure. A lithium ion secondary battery 10 shown in FIG. 1 comprises a rolled-type electrode element 14 in which a positive electrode 11 and a negative electrode 12 are rolled with a separator 13 therebetween, an electrolyte solution, insulating plates 18 and 19 respectively placed above and below the electrode element 14, and a battery casing 15 which houses the above-described members. The battery casing 15 is formed from a casing body 16 having a circular cylindrical shape with a bottom, and a sealing element 17 which blocks an opening of the casing body 16.

Alternatively, in place of the rolled-type electrode element 14, an electrode element of other forms may be employed, such as a layered-type electrode element in which the positive electrode and the negative electrode are alternately layered with the separator therebetween. As the battery casing 15, there may be exemplified a metal casing of a shape such as a cylindrical shape, a polygonal shape, a coin shape, a button shape, or the like, and a resin casing (laminated-type battery) formed by laminating resin sheets.

The casing body 16 is, for example, a metal container having a circular cylindrical shape with a bottom. A gasket 28 is provided between the casing body 16 and the sealing element 17, to secure airtightness in the battery. The casing body 16 has, for example, a protrusion 22 in which a part of a side surface portion of the casing body 16 protrudes to an inner side and which supports the sealing element 17. The protrusion 22 is desirably formed in an annular shape along a circumferential direction of the casing body 16, and supports the sealing element 17 with an upper surface thereof.

The sealing element 17 has a structure in which a filter 23, a lower valve element 24, an insulating member 25, an upper valve element 26, and a cap 27 are layered in this order from the side of the electrode element 14. The members of the sealing element 17 have, for example, a circular disk shape or a ring shape, and members other than the insulating member 25 are electrically connected to each other. The lower valve element 24 and the upper valve element 26 are connected to each other at central parts thereof, and the insulating member 25 interposes between peripheral parts of the valve elements. When an internal pressure of the lithium ion secondary battery 10 is increased due to heat generation caused by internal short-circuiting or the like, for example, the lower valve element 24 deforms in such a manner to press the upper valve element 26 toward the side of the cap 27, and ruptures, so that a current path between the lower valve element 24 and the upper valve element 26 is cut off. When the internal pressure further increases, the upper valve element 26 ruptures, and gas is discharged from an opening of the cap 27.

In the lithium ion secondary battery 10 shown in FIG. 1, a positive electrode lead 20 attached to the positive electrode 11 extends through a throughhole of the insulating plate 18 to the side of the sealing element 17, and a negative electrode lead 21 attached to the negative electrode 12 extends through an outer side of the insulating plate 19 to the side of a bottom of the casing body 16. The positive electrode lead 20 is connected by welding or the like to a lower surface of the filter 23 which is a bottom plate of the sealing element 17, and the cap 27 which is a top plate of the sealing element 17 electrically connected to the filter 23 serves as a positive electrode terminal. The negative electrode lead 21 is connected by welding or the like to an inner surface of the bottom of the casing body 16, and the casing body 16 serves as a negative electrode terminal.

The positive electrode 11, the negative electrode 12, the separator 13, and the electrolyte solution of the lithium ion secondary battery 10 will now be described in detail.

[Positive Electrode]

The positive electrode 11 comprises a positive electrode electricity collector and a positive electrode mixture layer formed over the positive electrode electricity collector. For the positive electrode electricity collector, there may be employed a foil of a metal which is stable within a potential range of the positive electrode such as aluminum and an aluminum alloy, a film on a surface layer of which the metal is placed, or the like. The positive electrode mixture layer includes, for example, a positive electrode active material, a binder material, and an electrically conductive material. Desirably, the positive electrode mixture layer is formed over both surfaces of the positive electrode electricity collector. The positive electrode can be manufactured, for example, by applying a positive electrode mixture slurry including the positive electrode active material, the binder material, the electrically conductive material, or the like over the positive electrode electricity collector, drying the applied film, and rolling the dried film, to form the positive electrode mixture layer over both surfaces of the positive electrode electricity collector.

The positive electrode active material includes a lithium-containing metal composite oxide as a primary constituent. As metal elements contained in the lithium-containing metal composite oxide, there may be exemplified Ni, Co, Mn, Al, B, Mg, Ti, V, Cr, Fe, Cu, Zn, Ga, Sr, Zr, Nb, In, Sn, Ta, W, Ca, Sb, Pb, Bi, and Ge. A desirable example of the lithium-containing metal composite oxide is a composite oxide containing at least one of Ni, Co, Mn, and Al.

As the electrically conductive material included in the positive electrode mixture layer, there may be exemplified carbon materials such as carbon black, acetylene black, Ketjen black, graphite, or the like. As the binder material included in the positive electrode mixture layer, there may be exemplified a fluororesin such as polytetrafluoroethylene (PTFE), polyvinylidene fluoride (PVDF), or the like, polyacrylonitrile (PAN), polyimide, an acrylic resin, polyolefin, or the like. Alternatively, carboxymethyl cellulose (CMC) or a salt thereof or polyethylene oxide (PEO) or the like may be used along with the above-described resins.

[Negative Electrode]

Figure 2:
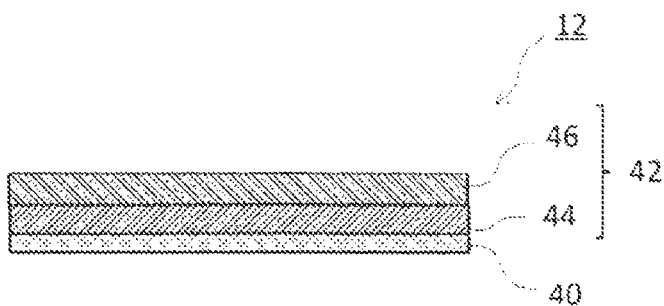
FIG. 2 is a cross-sectional diagram of a negative electrode according to an embodiment of the present disclosure.

FIG. 2 is a cross-sectional diagram of a negative electrode according to an embodiment of the present disclosure. The negative electrode 12 shown in FIG. 2 comprises a negative electrode electricity collector 40, and a negative electrode mixture layer 42 formed over the negative electrode electricity collector 40. For the negative electrode electricity collector 40, for example, there may be employed a foil of a metal which is stable within a potential range of the negative electrode such as copper and a copper alloy, a film on a surface layer of which the metal is placed.

The negative electrode mixture layer 42 formed over the negative electrode electricity collector 40 is formed including a first layer 44 and a second layer 46. The first layer 44 is disposed over the negative electrode electricity collector 40, and the second layer 46 is disposed over the first layer 44. Desirably, the negative electrode mixture layer 42 is formed over both surfaces of the negative electrode electricity collector 40. The second layer 46 being "disposed" "over" the first layer 44 means that the second layer 46 may be disposed directly on the first layer 44, or an intermediate layer may be present between the second layer 46 and the first layer 44.

The first layer 44 includes, as a negative electrode active material, graphite particles B having a particle internal porosity of greater than 10%. The second layer 46 includes, as the negative electrode active material, graphite particles A having a particle internal porosity of 10% or lower. It is sufficient that the internal porosity of the graphite particles A be 10% or lower from the viewpoint of improving the charge/discharge cycle characteristic or the like, but is desirably 1%~5%, and is more desirably 3%~5%. It is sufficient that the internal porosity of the graphite particles B be greater than 10% from the viewpoint of suitable collapsing in a compression process in negative electrode manufacturing, but is desirably 12%~25%, and is more desirably 12%~23%.

The graphite particles A having the particle internal porosity of 10% or lower are particles with a small BET specific surface area, such as, for example, in a range of 1.0 $m^2/g$~1.6 $m^2/g$. The graphite particles B having the particle internal porosity of greater than 10% are particles with a large BET specific surface area, such as, for example, 3.0 $m^2/g$~20 $m^2/g$. The BET specific surface area is measured according to the BET method (nitrogen adsorption method) described in the JIS R1626 standard.

Figure 3:
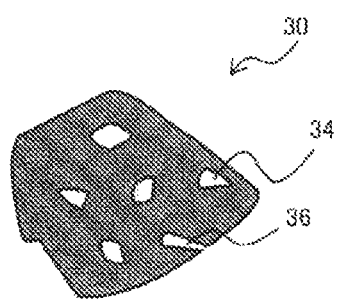
FIG. 3 is a schematic diagram showing a cross section of a graphite particle.

FIG. 3 is a schematic diagram showing a cross section of the graphite particle. As shown in FIG. 3, a graphite particle 30 includes a pore 34 which is closed and is not connected from an inside of the particle to a surface of the particle in a cross-sectional view of the graphite particle 30, and a pore 36 connected from the inside of the particle to the surface of the particle in the cross-sectional view. The pore 34 will hereinafter be referred to as an internal pore 34, and the pore 36 will hereinafter be referred to as an external pore 36. In the present embodiment, the internal porosity of the graphite particle is a two-dimensional value determined from a ratio of an area of the internal pore of the graphite particle with respect to a cross-sectional area of the graphite particle, and is specifically determined in the following procedure.

<Method of Measuring Internal Porosity>

(1) A cross section of the negative electrode active material is exposed. As a method of exposing the cross section, for example, a method may be employed in which a part of the negative electrode is cut, and machined with an ion milling apparatus (for example, IM4000PLUS manufactured by Hitachi High-Tech Corporation), and the cross section of the negative electrode mixture layer is exposed.

(2) Using a scanning electron microscope, a backscattered electron image of the exposed cross section of the negative electrode mixture layer is captured. A magnification when the backscattered electron image is captured is 3000 times to 5000 times.

(3) A cross-sectional image acquired by the above-described process is read into a computer, a binarization process is applied using an image analyzing software (such as, for example, ImageJ manufactured by National Institutes of Health), and a binarized image is acquired in which a particle cross section in the cross-sectional image is converted into black color and pores existing in the particle cross section are converted into white color.

(4) From the binarized image, the area of the graphite particle cross section and the area of the internal pores existing in the graphite particle cross section are calculated. Here, the area of the graphite particle cross section refers to an area of a region surrounded by an outer periphery of the graphite particle, that is, an area of all of the cross-sectional portion of the graphite particle. In addition, among the pores existing in the graphite particle cross section, for pores having a width of 3 μm or lower, it may be difficult to judge whether the pore is the internal pore or the external pore in the image analysis, and thus, the pores having the width of 3 μm or lower may be determined as internal pores. Based on the calculated area of the graphite particle cross section and the calculated area of the internal pores of the graphite particle cross section, the internal porosity of the graphite particle is calculated ((internal porosity of the graphite particle)=(area of the internal pores of the graphite particle cross section)*100/(area of the graphite particle cross section)). An average of internal porosities of 10 graphite particles is taken as the internal porosity of the graphite particles.

Desirably, a number of the graphite particles B included in the first layer 44 is larger than a number of the graphite particles B included in the second layer 46 from the viewpoint of improving the charge/discharge cycle characteristic. Specifically, an amount of the graphite particles B in the first layer 44 is desirably within a range of 50 mass %~90 mass % with respect to a total amount of the graphite particles B in the negative electrode mixture layer 42. The first layer 44 may include, as the negative electrode active material, the graphite particles A having the particle internal porosity of 10% or lower, but desirably, a content of the graphite particles A in the first layer 44 is 10 mass % or lower with respect to a total amount of the graphite particles A in the negative electrode mixture layer 42, from the viewpoint of improving the charge/discharge cycle characteristic.

Desirably, a number of the graphite particles A included in the second layer 46 is larger than a number of the graphite particles A included in the first layer 44, from the viewpoint of improving the charge/discharge cycle characteristic. Specifically, an amount of the graphite particles A in the second layer 46 is desirably within a range of 40 mass % 100 mass % with respect to the total amount of the graphite particles A in the negative electrode mixture layer 42. The second layer 46 may include, as the negative electrode active material, the graphite particles B, but desirably, a content of the graphite particles B in the second layer 46 is 50 mass % or lower with respect to the total amount of the graphite particles B in the negative electrode mixture layer 42, from the viewpoint of improving the charge/discharge cycle characteristic.

The graphite particles A and B are manufactured, for example, in the following manner.

<Graphite Particles a Having Internal Porosity of 10% or Lower>

For example, cokes (precursors) which are a primary raw material are ground to a predetermined size, and, in a state in which the cokes are aggregated with a binder material, the aggregate is baked at a temperature of 2600° C. or greater for graphitization, and the resulting graphites are then filtered to obtain the graphite particles A of a desired size. Here, the internal porosity may be adjusted to a value of 10% or lower by a particle size of the precursor after the grinding, a particle size of the precursor in the aggregated state, or the like. For example, an average particle size (median size D50) of the precursor after the grinding is desirably in a range of 12 μm~20 μm.

<Graphite Particles B Having Internal Porosity of Greater than 10%>

For example, the cokes (precursors) which are a primary raw material are ground to a predetermined size, the cokes are aggregated with a binder agent, and, in a state in which the aggregate is pressurized and shaped in a block shape, the aggregate is baked at a temperature of 2600° C. or grater for graphitization. The block-shape formation after the graphitization is ground and filtered, to obtain the graphite particles B of a desired size. The internal porosity can be adjusted to a value of greater than 10% by an amount of volatile composition added to the block-shape formation.

When a part of the binder material added to the cokes (precursors) vaporizes during the baking, the binder material may be used as the volatile composition. A pitch may be exemplified as such a binder material.

No particular limitation is imposed on the graphite particles A and B used in the present embodiment, such as natural graphite and artificial graphite, but from the viewpoint of ease of adjustment of the internal porosity, the artificial graphite is desirably employed. A plane spacing ($d_{002}$) of a (002) plane determined by an X-ray wide angle diffraction for the graphite particles A and B used in the present embodiment is desirably, for example, 0.3354 nm or greater, is more desirably 0.3357 nm or greater, is desirably lower than 0.340 nm, and is more desirably 0.338 nm or lower. A crystallite size (Lc(002)) determined by the X-ray diffraction for the graphite particles A and B used in the present embodiment is desirably, for example, 5 nm or greater, is more desirably 10 nm or greater, is desirably 300 nm or lower, and is more desirably 200 nm or lower. No particular limitation is imposed on the average particle size for the graphite particles A and B, but the average particle size is, for example, 1 μm~30 μm. The average particle size means a volume-average particle size (Dv50) in which a volume accumulated value becomes 50% in a granularity distribution measured by laser diffraction scattering.

It is sufficient that a water contact angle of the second layer 46 be 50° or lower from the viewpoints of facilitating infiltration of the electrolyte solution into the inside of the negative electrode 12, and of improving the charge/discharge cycle characteristic, but the water contact angle of the second layer 46 is desirably 40° or lower, and is more desirably 35° or lower.

The water contact angle is determined using a contact angle meter (DM-501 manufactured by Kyowa Interface Science Co., Ltd.), and by dropping 2.2 μL of water drops on a sample surface (surface of the second layer), imaging a shape of the water drop immediately after the dropping, and measuring the water contact angle using a θ/2 method based on the acquired image.

The water contact angle of the second layer 46 changes, for example, by a volume ratio of the graphite particles A in the second layer 46, a packing density of the negative electrode mixture layer 42 (or a packing density of the second layer 46), or the like.

A volume ratio of the graphite particles A in the second layer 46 with respect to a total volume of the second layer 46 is desirably 29 volume % or greater from the viewpoint of setting the water contact angle of the second layer 46 to 50° or lower, and is more desirably 50 volume % or greater.

The packing density of the negative electrode mixture layer 42 (or the packing density of the second layer 46) is desirably in a range of, for example, 1.50 g/cm³~1.65 g/cm³, from the viewpoint of setting the water contact angle of the second layer 46 to 50° or lower, and is more desirably in a range of 1.4 g/cm³~1.5 g/cm³.

The negative electrode mixture layer 42 may include an alloying material as the negative electrode active material. By including the alloying material, it becomes possible to increase a capacity of the lithium ion secondary battery. The alloying material may be contained in the same amount in the first layer 44 and in the second layer 46, or may be contained in a larger amount in either of the layers. From the viewpoint of suppressing reduction of the charge/discharge cycle characteristic of the lithium ion secondary battery, desirably, the alloying material is contained in a larger amount in the second layer 46 than in the first layer 44, and a content of the alloying material in the second layer 46 is desirably in a range of 75 mass %~100 mass % with respect to a total amount of the alloying material in the negative electrode mixture layer 42. When a ratio of the alloying material in the negative electrode mixture layer 42 becomes high, the improvement advantage of the charge/discharge cycle characteristic is reduced. Therefore, the content of the alloying material is desirably 15 mass % or lower with respect to the total amount of the negative electrode active material in the negative electrode mixture layer 42. A lower limit value of the content of the alloying material is desirably 5 mass % or greater with respect to the total amount of the negative electrode active material in the negative electrode mixture layer 42, from the viewpoint of increasing the capacity of the lithium ion secondary battery, and is more desirably 8 mass % or greater.

The alloying material is formed including an element which alloys with lithium, a compound containing an element which becomes a lithium alloy, or both. As elements which alloy with lithium and which can be applied for the negative electrode active material, there may be exemplified Al, Ga, In, Si, Ge, Sn, Pb, As, Sb, Bi, or the like. Of these, Si and Sn are desirable from the viewpoint of increasing the capacity, and Si is particularly desirable.

As compounds containing Si, there may be exemplified compounds containing a silicon oxide phase and Si dispersed in the silicon oxide phase, and compounds containing a lithium silicate phase and Si dispersed in the lithium silicate phase. The compounds containing the silicon oxide phase and Si dispersed in the silicon oxide phase are described as "SiO" in the following description. The compounds containing the lithium silicate phase and Si dispersed in the lithium silicate phase are described as "LSX" in the following description.

On surfaces of the particles of SiO and LSX, an electrically conductive layer formed from a material of a high electrical conductivity may be formed. An example of a desirable electrically conductive layer is a carbon coating formed from a carbon material. The carbon coating is formed from, for example, carbon black, acetylene black, Ketjen black, graphite, or a mixture of two or more of these materials. As a method of carbon-coating the surfaces of the particles of SiO and LSX, there may be exemplified a CVD method using acetylene, methane or the like, or a method in which a coal pitch, a petroleum pitch, a phenol resin, or the like is mixed with the particles of SiO and LSX, and a thermal treatment is applied. Alternatively, the carbon coating may be formed by fixing a carbon powder such as the carbon black on the surface of the particle using a binder material.

A desirable SiO has a sea-island structure in which fine Si particles are approximately uniformly dispersed in an amorphous silicon oxide phase, and is represented by a general formula, $SiO_x$ ($0.5 \le x \le 1.6$). A content of the Si particles is desirably 35 mass %~75 mass % with respect to a total mass of SiO, from the viewpoint of realizing both the battery capacity and the cycle characteristic.

An average particle size of the Si particles dispersed in the silicon oxide phase is typically 500 nm or lower before charging and discharging, is desirably 200 nm or lower, and is more desirably 50 nm or lower. After the charging and discharging, the average particle size is desirably 400 nm or lower, and is more desirably 100 nm or lower. By making the Si particles finer, the volume change during the charging and discharging is reduced, and the cycle characteristic is improved. The average particle size of the Si particles is measured by observing the cross section of SiO using a scanning electron microscope (SEM) or a transmission electron microscope (TEM), and is more specifically determined as an average value of the longest sizes of 100 Si particles. The silicon oxide phase is formed, for example, by a collection of particles finer than the Si particles.

Desirable LSX has a sea-island structure in which fine Si particles are approximately uniformly dispersed in the lithium silicate phase represented by a general formula, $Li_{2z}SiO_{(2+z)}$ (wherein $0<z<2$). Similar to the SiO, a content of the Si particles is desirably 35 mass %~75 mass % with respect to a total mass of the LSX. An average particle size of the Si particles is typically 500 nm or lower before charging and discharging, is desirably 200 nm or lower, and is more desirably 50 nm or lower. The lithium silicate phase is formed from, for example, a collection of particles finer than Si particles.

As described above, the lithium silicate phase is desirably formed from a compound represented by $Li_{2z}SiO_{(2+z)}$ (wherein $0<z<2$). That is, the lithium silicate phase does not include $Li_4SiO_4$ ($z=2$). $Li_4SiO_4$ is an unstable compound, reacts with water to show an alkaline characteristic, and thus, may alter Si to consequently cause degradation of the charge/discharge capacity. For the lithium silicate phase, desirably, $Li_2SiO_3$ ($z=1$) or $Li_2Si_2O_5$ ($z=½$) is employed as a primary consitutent, from the viewpoints of stability, ease of manufacture, electrical conductivity by the lithium ions, or the like.

The SiO may be manufactured by the following process.

(1) Si and silicon oxide are mixed in a weight ratio of, for example, 20:80~95:5, to manufacture a mixture.

(2) At least before or after the manufacture of the mixture, for example, Si and silicon oxide are ground with a ball mill, to form fine particles.

(3) The ground mixture is thermally treated, for example, at a temperature of 600° C.~1000° C., under an inert atmosphere.

In the above-described process, LSX may be manufactured by using lithium silicate in place of the silicon oxide.

The negative electrode mixture layer 42 desirably includes a binder material. For the binder material, for example, there may be exemplified a fluororesin such as polytetrafluoroethylene (PTFE), polyvinylidene fluoride (PVDF), or the like, polyacrylonitrile (PAN), polyimide, an acrylic resin, polyolefin, a polyacrylic acid (PAA) or a salt thereof, styrene-butadiene rubber, carboxymethyl cellulose (CMC) or a salt thereof, or the like.

A content of the binder material in the negative electrode mixture layer 42 is, for example, desirably 0.5 mass %~10 mass % with respect to the total amount of the negative electrode mixture layer 42, and is more desirably 1 mass %~5 mass %.

Because the styrene-butadiene rubber is a material which affects the water contact angle of the second layer 46, when the styrene-butadiene rubber is contained in the negative electrode mixture layer 42, desirably, the styrene-butadiene rubber is contained in a larger amount in the first layer 44 than in the second layer 46, in order to set the water contact angle of the second layer 46 to 50° or lower.

The negative electrode mixture layer 42 desirably contains fibrous carbon. By containing the fibrous carbon, a superior electrically conductive path is formed in the negative electrode mixture layer 42, and the charge/discharge cycle characteristic can be more effectively improved. The fibrous carbon may be contained in the same amount in the first layer 44 and the second layer 46, or may be contained in a larger amount in either of the layers. However, when the alloying material is contained in a larger amount in the second layer 46 than in the first layer 44, the fibrous carbon is desirably contained in a larger amount in the second layer 46 than in the first layer 44, from the viewpoint of maintaining the electrically conductive path to the alloying material.

As the fibrous carbon, there may be exemplified carbon nanotube (CNT), carbon nanofiber, or the like. The CNT may be, in addition to a single-layer CNT, a two-layer CNT, a multi-layer CNT, or a mixture of these. The CNT may be a vapor phase grown carbon fiber. The fibrous carbon has, for example, a diameter of 2 nm~20 μm, and an overall length of 0.03 μm~500 μm. A content of the fibrous carbon in the negative electrode mixture layer 42 is, for example, desirably 0.01 mass %~5 mass % with respect to the total amount of the negative electrode mixture layer 42, and is more desirably 0.5 mass %~3 mass %.

A thickness of the negative electrode mixture layer 42 is, for example, 30 μm~100 μm, or 50 μm~80 μm, on one side of the negative electrode electricity collector 40. Thicknesses of the first layer 44 and the second layer 46 may be the same or different from each other. However, from the viewpoint of ease of obtaining the improvement advantage of the charge/discharged cycle characteristic, the thickness of the second layer 46 is desirably ⅓ or greater of the thickness of the negative electrode mixture layer 42, and is more desirably in a range of ⅓~½ of the thickness of the negative electrode mixture layer 42.

As described above, an intermediate layer may be provided between the first layer 44 and the second layer 46. The intermediate layer may include the graphite particles A, the graphite particles B, and the alloying material described above, or may include other negative electrode active materials or the like which are known in the prior art. In any case, the intermediate layer may be designed within a range of not adversely affecting the advantage of the present disclosure.

The negative electrode 12 is manufactured, for example, in the following method. A first negative electrode mixture slurry for the first layer 44 including the graphite particles B, and the binder material, or the like, is prepared. A second negative electrode mixture slurry for the second layer 46 including the graphite particles A, and the binder material, or the like, is prepared. The first negative electrode mixture slurry is applied over the negative electrode electricity collector 40, and the applied film is dried, to form the first layer 44 over the negative electrode electricity collector 40. Then the second negative electrode mixture slurry is applied over the first layer 44, the applied film is dried, to form the second layer 46 over the first layer 44, and then, the first layer 44 and the second layer 46 are compressed. In this manner, the negative electrode 12 is obtained in which the negative electrode mixture layer 42 including the first layer 44 and the second layer 46 is formed over the negative electrode electricity collector 40.

[Separator]

For the separator 13, a porous sheet having an ion permeability and an insulating property is used. Specific examples of the porous sheet include a microporous thin film, a woven fabric, a non-woven fabric, or the like. As the material of the separator 13, desirably, an olefin-based resin such as polyethylene, polypropylene, and a copolymer including at least one of ethylene and propylene, or the like, cellulose, or the like is used. The separator 13 may have a single-layer structure or a layered structure. Over a surface of the separator 13, a heat resistive layer or the like may be formed.

[Electrolyte Solution]

The electrolyte solution includes a solvent and an electrolyte salt. For the electrolyte salt, for example, lithium salt such as $LiBF_4$ and $LiPF_6$ is employed. For the solvent, for example, there may be employed esters such as ethylene carbonate (EC), propylene carbonate (PC), dimethyl carbonate (DMC), ethylmethyl carbonate (EMC), diethyl carbonate (DEC), and methyl propionate (MP), ethers, nitriles, amides, or a mixture solvent of two or more of these. A non-aqueous solvent may contain a halogen substitution product in which at least a part of hydrogen of the solvent is substituted with a halogen atom such as fluorine.

As the halogen substitution product, for example, there may be exemplified fluorinated cyclic ester carbonates such as fluoroethylene carbonate (FEC), fluorinated chain ester carbonates, and fluorinated chain ester carboxylates such as fluoromethyl propionate (FMP).

EXAMPLES

The present disclosure will now be further described with reference to Examples.

The present disclosure, however, is not limited to these Examples.

Example 1

[Positive Electrode]

90 parts by mass of lithium cobaltate serving as a positive electrode active material, 5 parts by mass of graphite serving as an electrically conductive material, and 5 parts by mass of polyvinylidene fluoride powder serving as a binder material were mixed, and a suitable amount of N-methyl-2-pyrrolidone (NMP) was added, to prepare a positive electrode mixture slurry. The slurry was applied by a doctor blade method on both surfaces of an electricity collector formed from an aluminum foil (having a thickness of 15 μm), the applied film was dried, and the dried applied film was compressed with a rolling roller, to form a positive electrode in which a positive electrode active material layer was formed over both surfaces of the positive electrode electricity collector.

[Manufacturing of Graphite Particles A]

Cokes were ground until an average particle size thereof (median size D50) became 15 μm, a pitch was added as a binder material to the ground cokes, and the cokes were aggregated until the average particle size (median size D50) became 17 μm. The aggregate was baked at a temperature of 2800° C. for graphitization, and was filtered using a 250-mesh filter, to obtain graphite particles A having an average particle size (median size D50) of 26 μm.

[Manufacturing of Graphite Particles B]

Cokes were ground until an average particle size (median size D50) became 15 μm, a pitch serving as a binder material was added to the ground cokes, and the cokes were aggregated. Then, an isotopic pressure was applied to form a block-shape formation having a density of 1.6 g/cm$^3$~1.9 g/cm$^3$. The block-shape formation was baked at a temperature of 2800° C. for graphitization, and the block-shape formation was ground and filtered using a 250-mesh filter, to obtain graphite particles B having an average particle size (median size D50) of 19 μm.

[Manufacturing of Negative Electrode]

Using the graphite particles B as a negative electrode active material, the graphite particles B, CMC, and styrene-butadiene rubber were mixed in such a manner that a mass ratio of (graphite particles B):(CMC):(styrene-butadiene rubber) was 100:1:1, and a suitable amount of water was added, to prepare a first negative electrode mixture slurry for a first layer. Using a mixture in which 86 parts by mass of the graphite particles A and 14 parts by mass of a Si compound (SiO) were mixed as a negative electrode active material, the negative electrode active material, the CMC, and the styrene-butadiene rubber were mixed in such a manner that a mass ratio of (negative electrode active material):(CMC):(styrene-butadiene rubber) was 100:1:1, and a suitable amount of water was added, to prepare a second negative electrode mixture slurry for a second layer.

The first negative electrode mixture slurry was applied over both surfaces of a negative electrode electricity collector formed from a copper foil, and the applied film was dried, to form a first layer over both surfaces of the negative electrode electricity collector. Then, the second negative electrode mixture slurry was applied over the first layer formed over both surfaces of the negative electrode electricity collector, and the applied film was dried, to form a second layer. The applied films were rolled using a roller, to manufacture a negative electrode in which a negative electrode mixture layer including the first layer and the second layer was formed over both surfaces of the negative electrode electricity collector. A density of the negative electrode mixture layer was 1.6 g/cc, and a thickness ratio of (first layer):(second layer) was 1:1.

A water contact angle of the second layer in the manufactured negative electrode was measured, and was 31°. The method of measurement is identical to the method described above, and will not be repeatedly described.

Particle internal porosities of the graphite particles A and the graphite particles B in the manufactured negative electrode were measured, and were respectively 5% and 22%. In the following Examples and Comparative Examples, the same particle internal porosities were observed. The method of measurement is identical to the method described above, and will not be repeatedly described.

A volume ratio of the graphite particles A in the second layer with respect to a total volume of the second layer was 86 volume %, and a volume ratio of the Si compound in the second layer was 14 volume %. Because the graphite particles and the Si compounds which were used were equivalent, the masses of the graphite particles and the Si compound materials introduced to the negative electrode mixture slurry correspond to the volumes of the graphite particles and the Si compound materials. That is, the volume % described above is identical to the mass %.

[Electrolyte Solution]

To a mixture solvent in which ethylene carbonate (EC), fluorinated ethylene carbonate (FEC), and diethyl carbonate (DEC) were mixed with a volume ratio of 27:3:70, 1 mass % of vinylene carbonate (VC) was added, and LiPF$_6$ was dissolved in a ratio of 1.2 mol/L, to prepare an electrolyte solution.

[Test Cell]

The positive electrode and the negative electrode were layered in a manner to oppose each other with the separator therebetween, and the resulting structure was rolled to manufacture an electrode element. Then, the electrode element and the electrolyte solution were housed in a battery casing body having a circular cylindrical shape with a bottom, the electrolyte solution was injected, and the opening of the battery casing body was sealed with a gasket and a sealing element, to prepare a test cell.

Example 2

A test cell was manufactured in a manner similar to Example 1 except that, in the preparation of the second negative electrode mixture slurry, a mixture in which 29 parts by mass of the graphite particles A, 57 parts by mass of the graphite particles B, and 14 parts by mass of the Si compound were mixed was used as the negative electrode active material.

The water contact angle of the second layer in the manufactured negative electrode was 50°. In addition, a volume ratio of the graphite particles A in the second layer with respect to a total volume of the second layer was 29 volume %, a volume ratio of the graphite particles B in the second layer was 57 volume %, and a volume ratio of the Si compound in the second layer was 14 volume %.

Example 3

A test cell was manufactured in a manner similar to Example 1, except that, in the preparation of the second negative electrode mixture slurry, the negative electrode active material and the CMC were mixed with a mass ratio of 100:1 (that is, no styrene-butadiene rubber was added). The water contact angle of the second layer in the manufactured negative electrode was 28°.

Example 4

A test cell was manufactured in a manner similar to Example 1 except that the thickness ratio of (second layer): (first layer) was set to 1:2. The water contact angle of the second layer in the manufactured negative electrode was 31°.

Example 5

A test cell was manufactured in a manner similar to Example 1 except that, in the preparation of the second negative electrode mixture slurry, the negative electrode active material, the CMC, the styrene-butadiene rubber, and CNT were mixed with a mass ratio of (negative electrode active material):(CMC):(styrene-butadiene rubber):(CNT) of 100:1:1:1, The water contact angle of the second layer in the manufactured negative electrode was 31'.

Comparative Example 1

Using a mixture in which 93 parts by mass of the graphite particles B and 7 parts by mass of a Si compound (SiO) were mixed as a negative electrode active material, the negative electrode active material, the CMC, and the styrene-butadiene rubber were mixed with a mass ratio of (negative electrode active material):(CMC):(styrene-butadiene rubber) of 100:1:1, and a suitable amount of water was added, to prepare a negative electrode mixture slurry. The negative electrode mixture slurry was applied over both surfaces of a negative electrode electricity collector formed from a copper foil, the applied film was dried, and the dried applied film was rolled using a roller, to manufacture a negative electrode in which a negative electrode mixture layer was formed over both surfaces of the negative electrode electricity collector. A test cell was manufactured using this negative electrode, in a manner similar to Example 1. The water contact angle of the negative electrode mixture layer in the manufactured negative electrode was 119°. A volume ratio of the Si compound in the negative electrode mixture layer with respect to a total volume of the negative electrode mixture layer was 7 volume %.

Comparative Example 2

A test cell was manufactured in a manner similar to Example 1 except that, in the preparation of the first negative electrode mixture slurry, a mixture in which 86 parts by mass of the graphite particles A and 15 parts by mass of the Si compound (SiO) were mixed was used as the negative electrode active material, and, in the preparation of the second negative electrode mixture slurry, the graphite particles B were employed as the negative electrode active material.

The water contact angle of the second layer in the manufactured negative electrode was 119°. A volume ratio of the graphite particles A in the first layer with respect to a total volume of the first layer was 86 volume %, and a volume ratio of the Si compound in the first layer was 14 volume %.

Comparative Example 3

A test cell was manufactured in a manner similar to Example 1 except that, in the preparation of the second negative electrode mixture slurry, a mixture in which 86 parts by mass of the graphite particles B and 14 parts by mass of the Si compound (SiO) were mixed was used as the negative electrode active material.

The water contact angle of the second layer in the manufactured negative electrode was 110°. A volume ratio of the Si compound in the second layer with respect to a total volume of the second layer was 14 volume %.

Comparative Example 4

A test cell was manufactured in a manner similar to Example 1 except that, in the preparation of the second negative electrode mixture slurry, a mixture in which 21.5 parts by mass of the graphite particles A, 64.5 parts by mass of the graphite particles B, and 14 parts by mass of the Si compound (SiO) were mixed was used as the negative electrode active material.

The water contact angle of the second layer in the manufactured negative electrode was 103°. A volume ratio of the graphite particles A in the second layer with respect to a total volume of the second layer was 21.5%, and a volume ratio of the Si compound in the second layer was 14 volume %.

[Evaluation of Capacity Maintenance Percentage at 200 Cycles]

Under a temperature environment of 25° C., the test cell was charged with a constant current of 0.5 C until the battery voltage reached 4.2V, and then charged with a constant voltage of 42V until a current value reached 1/50 C. Then, a constant-current discharge was performed with a constant current of 1.0 C until the battery voltage reached 2.5V. The charging and discharging were performed for 200 cycles, and a capacity maintenance percentage at the charge/discharge cycle was calculated according to the following formula.

Capacity maintenance percentage=((discharge capacity at 200th cycle)/(discharge capacity at 4th cycle))×100

Results of evaluation (capacity maintenance percentage at 200 cycles) for the test cells of Examples 1~5 and Comparative Examples 1~4 are shown in TABLE 1.

TABLE 1

| | Water contact angle (°) | Si Compound volume ratio (%) | | Graphite particles A volume ratio (%) | | SBR content (%) | | CNT content (%) | Thickness ratio | Test Result Charge/discharge cycle capacity |
| --- | --- | --- | --- | --- | --- | --- | --- | --- | --- | --- |
| | | Second layer | First layer | Second layer | First layer | Second layer | First layer | Second layer | Second layer: first layer | maintenance percentage |
| Example 1 | 31 | 14 | 0 | 86 | 0 | 1 | 1 | 0 | 1:1 | 93% |
| Example 2 | 50 | 14 | 0 | 29 | 0 | 1 | 1 | 0 | 1:1 | 94% |
| Example 3 | 28 | 14 | 0 | 86 | 0 | 0 | 1 | 0 | 1:1 | 94% |
| Example 4 | 31 | 14 | 0 | 86 | 0 | 1 | 1 | 0 | 1:2 | 93% |
| Example 5 | 31 | 14 | 0 | 86 | 0 | 1 | 1 | 1 | 1:1 | 95% |
| Comparative Example 1 | 119 | 7 | | 0 | | 1 | | 0 | — | 90% |
| Comparative Example 2 | 119 | 0 | 14 | 0 | 86 | 1 | 1 | 0 | 1:1 | 90% |
| Comparative Example 3 | 110 | 14 | 0 | 0 | 0 | 1 | 1 | 0 | 1:1 | 91% |
| Comparative Example 4 | 103 | 14 | 0 | 21.5 | 0 | 1 | 1 | 0 | 1:1 | 91% |

It can be seen that the test cells of Examples 1~5 had higher values of the capacity maintenance percentage at the charge/discharge cycle than the test cells of Comparative Examples 1~4, and that the charge/discharge cycle characteristic was improved.

Based on these results, it can be said that the charge/discharge cycle characteristic of the lithium ion secondary battery is improved using a negative electrode in which the second layer includes the graphite particles A having a particle internal porosity of 10% or lower, the first layer includes the graphite particles B having a particle internal porosity of greater than 10%, and the water contact angle of the second layer is 50% or lower.

REFERENCE SIGNS LIST

10 LITHIUM ION SECONDARY BATTERY; 11 POSITIVE ELECTRODE; 12 NEGATIVE ELECTRODE; 13 SEPARATOR; 14 ELECTRODE ELEMENT; 15 BATTERY CASING: 16 CASING BODY; 17 SEALING ELEMENT; 18 INSULATING PLATE; 18, 19 INSULATING PLATE; 20 POSITIVE ELECTRODE LEAD; 21 NEGATIVE ELECTRODE LEAD; 22 PROTRUSION; 23 FILTER; 24 LOWER VALVE ELEMENT; 25 INSULATING MEMBER; 26 UPPER VALVE ELEMENT; 27 CAP; 28 GASKET; 30 GRAPHITE PARTICLE; 34 INTERNAL PORE; 36 EXTERNAL PORE; 40 NEGATIVE ELECTRODE ELECTRICITY COLLECTOR; 42 NEGATIVE ELECTRODE MIXTURE LAYER; 44 FIRST LAYER; 46 SECOND LAYER.

The invention claimed is:

1. A negative electrode for a lithium ion secondary battery, the negative electrode comprising:
 a negative electrode electricity collector; and
 a negative electrode mixture layer formed over the negative electrode electricity collector, wherein
 the negative electrode mixture layer includes a first layer disposed over the negative electrode electricity collector, and a second layer disposed over the first layer,
 the second layer includes graphite particles A having a particle internal porosity of 10% or lower, and the first layer includes graphite particles B having a particle internal porosity of greater than 10%,
 a water contact angle of the second layer is 50° or lower, and
 a volume ratio of the graphite particles A in the second layer with respect to a total volume of the second layer is 29 volume % or greater.

2. The negative electrode for the lithium ion secondary battery according to claim 1, wherein
 the negative electrode mixture layer contains an alloying material which alloys with lithium and,
 the alloying material is contained in a larger amount in the second layer than in the first layer.

3. The negative electrode for the lithium ion secondary battery according to claim 2, wherein
 the negative electrode mixture layer contains fibrous carbon, and
 the fibrous carbon is contained in a larger amount in the second layer than in the first layer.

4. The negative electrode for the lithium ion secondary battery according to claim 1, wherein
 the negative electrode mixture layer contains styrene-butadiene rubber, and
 the styrene-butadiene rubber is contained in a larger amount in the first layer than in the second layer.

5. The negative electrode for the lithium ion secondary battery according to claim 4, wherein
 90 mass % or greater and 100 mass % of the styrene-butadiene rubber contained in the negative electrode mixture layer is contained in a half region on the side near the negative electrode electricity collector.

6. The negative electrode for the lithium ion secondary battery according to claim 1, wherein
 a thickness of the second layer is ⅓ or greater of a thickness of the negative electrode mixture layer.

7. A lithium ion secondary battery comprising:
 the negative electrode for the lithium ion secondary battery according to claim 1.

* * * * *